United States Patent
Douady et al.

(10) Patent No.: US 8,645,557 B2
(45) Date of Patent: Feb. 4, 2014

(54) SYSTEM OF INTERCONNECTIONS FOR EXTERNAL FUNCTIONAL BLOCKS ON A CHIP PROVIDED WITH A SINGLE CONFIGURABLE COMMUNICATION PROTOCOL

(75) Inventors: Cesar Douady, Orsay (FR); Philippe Boucard, Le Chesnay (FR)

(73) Assignee: QUALCOMM Technologies, Inc., San Diego, CA (US)

( * ) Notice: Subject to any disclaimer, the term of this patent is extended or adjusted under 35 U.S.C. 154(b) by 899 days.

(21) Appl. No.: 11/482,175

(22) Filed: Jul. 6, 2006

(65) Prior Publication Data

US 2007/0245044 A1    Oct. 18, 2007

(30) Foreign Application Priority Data

Apr. 12, 2006    (FR) ..................................... 06 03248

(51) Int. Cl.
*G06F 15/16* (2006.01)
(52) U.S. Cl.
USPC ............ 709/230; 711/141; 370/401; 370/485
(58) Field of Classification Search
USPC ................................................ 709/203, 230
See application file for complete search history.

(56) References Cited

U.S. PATENT DOCUMENTS

| | | | |
|---|---|---|---|
| 2,243,851 A | 6/1941 | Booth et al. | |
| 5,274,782 A * | 12/1993 | Chalasani et al. | 710/317 |
| 5,313,649 A | 5/1994 | Hsu et al. | |
| 5,408,634 A | 4/1995 | Joho | |
| 5,424,590 A | 6/1995 | Sato et al. | |
| 5,453,982 A | 9/1995 | Pennington et al. | |
| 5,473,761 A | 12/1995 | Parks et al. | |
| 5,490,253 A | 2/1996 | Laha et al. | |
| 5,495,197 A | 2/1996 | Hayashi et al. | |
| 5,541,932 A | 7/1996 | Nguyen et al. | |
| 5,604,775 A | 2/1997 | Saitoh et al. | |
| 5,651,002 A | 7/1997 | Van Seters et al. | |
| 5,764,093 A | 6/1998 | Hayashi et al. | |
| 5,784,374 A | 7/1998 | Runaldue | |

(Continued)

FOREIGN PATENT DOCUMENTS

| | | |
|---|---|---|
| EP | 752642 | 1/1997 |
| FR | 2814007 | 3/2002 |
| WO | 0195089 | 12/2001 |

OTHER PUBLICATIONS

A7.Olsson et al., "A Digital PLL made from Standard Cells" Proceedings from European Conference on Circuit Theory and Design (ECCTD) 2001, 4 pages.

(Continued)

*Primary Examiner* — Barbara Burgess
(74) *Attorney, Agent, or Firm* — Muncy, Geissler, Olds & Lowe, PLLC

(57) ABSTRACT

The system of interconnections (20) for external functional blocks on a chip provided with a single configurable communication protocol, comprises two physically separate communication networks (21, 22): a request network (21) for transmitting request messages from an initiating block (23, 24, 25, 26) to a recipient block (27, 28, 29, 30, 31) and a response network (22) for transmitting response messages from a recipient block (27, 28, 29, 30, 31) to an initiating block (23, 25, 26). The response messages include additional information making said request (21) and response (22) networks able to respectively manage the request messages and the response messages independently.

19 Claims, 2 Drawing Sheets

(56) References Cited

U.S. PATENT DOCUMENTS

| | | | |
|---|---|---|---|
| 5,844,954 | A | 12/1998 | Casasanta et al. |
| 5,931,926 | A | 8/1999 | Yeung et al. |
| 6,151,316 | A | 11/2000 | Crayford et al. |
| 6,211,739 | B1 | 4/2001 | Synder et al. |
| 6,260,152 | B1 | 7/2001 | Cole et al. |
| 6,269,433 | B1 | 7/2001 | Jones et al. |
| 6,339,553 | B1 | 1/2002 | Kuge |
| 6,400,720 | B1 | 6/2002 | Ovadia et al. |
| 6,549,047 | B2 | 4/2003 | Yamazaki et al. |
| 6,651,148 | B2 | 11/2003 | Widdup |
| 6,661,303 | B1 | 12/2003 | Ghoshal |
| 6,721,309 | B1 | 4/2004 | Stone et al. |
| 6,738,820 | B2 | 5/2004 | Hilt |
| 6,759,911 | B2 | 7/2004 | Gomm et al. |
| 6,778,545 | B1 | 8/2004 | Moataghed |
| 6,812,760 | B1 | 11/2004 | Kim et al. |
| 6,850,542 | B2 | 2/2005 | Tzeng |
| 6,901,074 | B1 | 5/2005 | Yamasaki |
| 6,915,361 | B2 | 7/2005 | Alpert et al. |
| 7,050,431 | B2 | 5/2006 | Tzeng |
| 7,148,728 | B2 | 12/2006 | Montperrus et al. |
| 2002/0085582 | A1 | 7/2002 | Kim |
| 2002/0087804 | A1* | 7/2002 | Khare et al. ............... 711/141 |
| 2002/0136235 | A1* | 9/2002 | Jarlstedt .................... 370/465 |
| 2002/0196785 | A1 | 12/2002 | Connor |
| 2003/0021281 | A1* | 1/2003 | Tanaka et al. ............. 370/401 |
| 2003/0093630 | A1 | 5/2003 | Richard et al. |
| 2003/0227932 | A1 | 12/2003 | Meempat et al. |
| 2004/0003181 | A1* | 1/2004 | Cypher ..................... 711/141 |
| 2004/0017820 | A1 | 1/2004 | Garinger et al. |
| 2004/0088472 | A1 | 5/2004 | Nystuen et al. |
| 2004/0128413 | A1 | 7/2004 | Chelcea et al. |
| 2004/0266435 | A1* | 12/2004 | de Jong et al. ............ 455/436 |
| 2005/0025169 | A1 | 2/2005 | Douady et al. |
| 2005/0086412 | A1 | 4/2005 | Douady et al. |
| 2005/0100014 | A1 | 5/2005 | Brown et al. |
| 2005/0104644 | A1 | 5/2005 | Montperrus et al. |
| 2005/0108420 | A1 | 5/2005 | Brown et al. |
| 2005/0117589 | A1 | 6/2005 | Douady et al. |
| 2005/0141505 | A1 | 6/2005 | Douady et al. |
| 2005/0154843 | A1 | 7/2005 | Douady et al. |
| 2005/0157717 | A1 | 7/2005 | Douady et al. |
| 2005/0210325 | A1 | 9/2005 | Douady et al. |
| 2006/0041889 | A1* | 2/2006 | Radulescu et al. ......... 719/313 |
| 2006/0115088 | A1* | 6/2006 | Valentine et al. .......... 380/270 |
| 2007/0002634 | A1 | 1/2007 | Montperrus |
| 2007/0081414 | A1 | 4/2007 | Douady et al. |
| 2007/0110052 | A1 | 5/2007 | Kok et al. |

OTHER PUBLICATIONS

A8.Olsson et al., "Fully integrated standard cell digital PLL" Electronic Letters, vol. 37, No. 4, Feb. 15, 2001, pp. 211-212.

A9.Olsson et al., "A Digitally Controlled PLL for Digital SOCs" IEEE International Symposium on Circuits and Systems, 2003, 4 pages.

Rogina et al., "Metastability Evaluation Method by Propagation Delay Distribution Measurement", IEEE Fourth Asian Test Symposium, 1995, p. 40-44.

Brown, "Measuring Metastability and its Effect on Communication Signal Processing Systems", IEEE Transactions on Instrumentation and Measurement, 1997:45:61-64ntation and Measurement, 1997:45:61-64.

Mu et al., "Self-tested Self-synchronization Circuit For Mesochronous Clocking", IEEE Transactions on Circuits and Systems II: Analog and Digital Signal Processing, 2001: 48:129-140.

French Search Report for French Application No. 0604348, 1 page.

Co-pending U.S. Appl. No. 11/516,811 entitled "System and Method for Managing Messages Transmitted in an Interconnect Network" filed Sep. 6, 2006.

Co-pending U.S. Appl. No. 11/518,384 entitled "System for Managing Messages Transmitted in an On-Chip Interconnect Network" filed Sep. 8, 2006.

Preliminary Examination Report for FR. 05/09279 issued May 9, 2006 (1 page).

Cheung et al., "Fuzzy Service Scheduling Scheme in ATM Networks", IEEE, Jun. 11, 2001, pp. 3122-3123.

French Search Report for French Application No. 0606833, 1 page.

French Search Report for French Application No. 0605646, 1 page.

Co-pending U.S. Appl. No. 11/585,837 entitled "Message Switching System" filed Jul. 11, 2006.

Co-pending U.S. Appl. No. 11/483,419 entitled "Process for Designing a Circuit for Synchronizing Data Asynchronously Exchanged Between Two Synchronous Blocks, and Synchronzation Circuit Fabricated by Same" filed Jul. 7, 2006.

French Search Report for French Application No. 0603248, 2 pages.

Anjo et al. "Wrapper-Based Bus Implementation Techniques for Performance Improvement and Cost Reduction", IEEE Journal of solid-State Circuits, May 2004, pp. 804-817.

Charlery et al. "Using VCI in a On-Chip System Around Spin Network", http://ww-asim.lip6.fr/{ema/pub/mixdes204.pdf>, Jun. 2004, pp. 811-817.

Guerrier et al., "A Generic Architecture for On-Chip Packet-Switched Interconnections", Mar. 2000, IEEE, pp. 250-254.

Tamir et al., "High-performance multi-queue buffers for VLSI communication switches", Computer Architecture, 1988, Conference Proceedings, 15th Annual International Symposium, May 30, 1988-Jun. 2, 1988, pp. 343-354, XP002266011.

Kermani et al., "Virtual Cut-Through: A New Computer Communication Switching Technique", Computer Networks, North Holland, Amsterdam, NL, vol. 3, 1979, pp. 267-286, XP000814463, ISSN: 0376-5075.

Yamaguchi et al. "CODA-R: a reconfigurable testbed for real-time parallel computation", Real-Time Computing Systems and Applications, 1997, Proceedings, Fourth International Workshop on Taipei, Taiwan Oct. 27-29, 1997, Los Alamitos, CA, USA, IEEE Comput. Soc., U.S., Oct. 27, 1997, pp. 252-259, XP010251835, ISBN: 0-8186-8073-3.

Toda et al., "A priority forwarding scheme for real-time multistage interconnection networks", Proceedings of the Real Time Systems Symposium, Phoenix, Dec. 2-4, 1992, Los Alamitos, IEEE Comp. Soc. Press, U.S. Dec. 2, 1002, pp. 208-217, XP010031283, ISBN: 0-8186-3195-3.

Toda et al., "Implementation of a priority Forwarding router chip for real-time interconnection networks", Parallel and Distributed Real-Time Systems, 1994, Proceedings of the Second Workshop on Cancun, Mexico, Apr. 28-29, 1994, Los Alamitos, CA, USA, IEEE Comput. Soc. Apr. 28, 1994, pp. 166-175, XP010125212, ISBN: 0-8186-6420-7.

Benini et al., "Networks on Chips: A New SoC Paradigm", Computer, IEEE Computer Society, Long Beach, CA, US, vol. 35, No. 1, Jan. 2002, pp. 70-78, XP001091890, ISSN: 0018-9162.

Liu et al., "Error control schemes for networks and applications: an overview", Mobile Networks and Applications, vol. 2, No. 2, Oct. 1997, pp. 167-182, XP002296032, Kluwer Academic Publishers, Hingham, MA, USA.

* cited by examiner

SYSTEM OF INTERCONNECTIONS FOR EXTERNAL FUNCTIONAL BLOCKS ON A CHIP PROVIDED WITH A SINGLE CONFIGURABLE COMMUNICATION PROTOCOL

FIELD OF THE INVENTION

The present invention relates to a system of interconnections for external functional blocks on a chip provided with a single configurable communication protocol.

BACKGROUND

The ongoing trend in technology means that increasingly complex systems made up of numerous different functional blocks can be integrated. These functional blocks are developed by different teams using different methods and communication protocols, these functional blocks being called intellectual properties.

It is therefore essential for these functional blocks to be able to intercommunicate, despite their different operating characteristics, such as the size of the data used and the frequencies used.

Furthermore, since the communicating elements are becoming more and more numerous, the systems need to be flexible or adaptable enough to support this trend.

Moreover, the cost of the wires in a system of interconnections has become dominant over the cost of the logic gates. Also, assessing an interconnection network architecture on silicon takes into account the conditions of use of the wires and their cost effectiveness (quantity of information transported in relation to the cost). Furthermore, since the time to market for new products is tending to shorten, the integration of the functional blocks needs to be more and more rapid. Also, the system or network of interconnections must be easy to implement.

Solutions exist for interconnecting IP functional blocks in a system of interconnections on a semiconductor chip, and are mostly based on data buses. These networks lack the necessary flexibility for rapid adaptation to technological changes and for increasing the number of communicating elements.

Such network architectures do not easily allow adaptation to the changing application-oriented requirements.

SUMMARY

Thus, one object of the invention is to propose a system of interconnections for external functional blocks on a chip provided with a single configurable communication protocol, that can easily be adapted according to the changing application-oriented requirements.

Thus, according to one aspect of the invention, there is proposed a system of interconnections for external functional blocks on a chip provided with a single configurable communication protocol. The system comprises two physically separate communication networks, a request network for transmitting request messages from an initiating block to a recipient block and a response network for transmitting response messages from a recipient block to an initiating block. Furthermore, the response messages include additional information making said request and response networks able to respectively manage the request messages independently of the response messages.

Since the request and response networks are capable of respectively managing the request messages independently of the response messages, they are autonomous. A response packet does not need to know the associated request, a change of size or frequency of the response packet is therefore possible without additional information and without saving the context between requests and responses within the system or network of interconnections.

According to an embodiment, said protocol is organized in a plurality of independent layers. Said independent layers comprise a transport layer defining the structure of a data packet, and a physical layer defining the signals interchanged at the interfaces of the elements of the system of interconnections. Address, data size and operation information is contained in the headers of the data packets.

Since the protocol is organized in separate layers, the rules that define the behaviour of a layer are independent of the way in which the preceding layer is implemented. This means it is easier to make optimizations on each layer, independently of the choices that might have been made on the other layers.

Furthermore, this makes it possible to reduce the number of wires needed, by using the same wires to convey both the data of the packets, and data representative of address and control information.

According to an embodiment, said additional information of the response message data packets includes information representative of the operation carried out, and information representative of the size of the data associated with said operation carried out.

For example, the operation is a data read or a data write.

According to an embodiment, following a read of data that is incomplete or unaligned in relation to the memory space accessed in said read, the packets of the response message associated with said read include, at a predetermined position, said data that has been read.

According to an embodiment, following a read of data that is incomplete or unaligned in relation to the memory space accessed in said read, the packets of the response message associated with said read include information for aligning said data that has been read in relation to said memory space accessed.

According to an embodiment, the interface between two elements of the system of interconnections comprises:
  means for receiving or transferring a clock timing signal,
  means for receiving or transferring signals for stopping or starting said elements independently,
  means of transferring flow control signals relating to the clock cycles,
  means of transferring data packet delimiting signals, and
  means of transferring signals of configurable size for transmitting the content of the data packets.

According to an embodiment of the invention, the interface between two elements of the system of interconnections also comprises signal generation means for favouring the transmission of some messages over others.

According to an embodiment, the headers of the data packets include an available space reserved for the use of the initiating blocks.

According to an embodiment, the data packets are of variable length, equal to a multiple of an elementary quantity of data. A system link can be programmed by the ratio between the quantity of data that it can transmit in each clock cycle and said elementary quantity of data.

According to an embodiment, the links include means of changing the clock frequency, and/or means of deleting data holes in the data packets in case of predictable hole ratios, and/or means of changing the serialization of the packets.

According to an embodiment, the elements of the system of interconnections are configurable by software means via a separate network.

For example, said separate network is able to operate at a low bit rate compared to the average bit rate in the system of interconnections.

Another aspect of the invention proposes generators of configurable IP blocks for constructing a system in a modular fashion as described previously, using standard interfaces. According to an embodiment, the generators comprise:

a generator of configurable protocol IP blocks, generators of network interface IP blocks between said configurable protocol and other communication protocols, generators of switch IP blocks, generators of IP blocks for changing clock, domain, compacting data packets, transporting packets over long distances, and programming ratios between the quantity of data that a link can transmit in each clock cycle and said elementary quantity of data, and generators of IP blocks of a separate network for configuring the elements of the system of interconnections.

Other aims, features and advantages of the invention will become apparent from reading the description that follows, of a few by no means limiting examples, and with reference to the appended drawings, in which:

DETAILED DESCRIPTION

Figure 1:
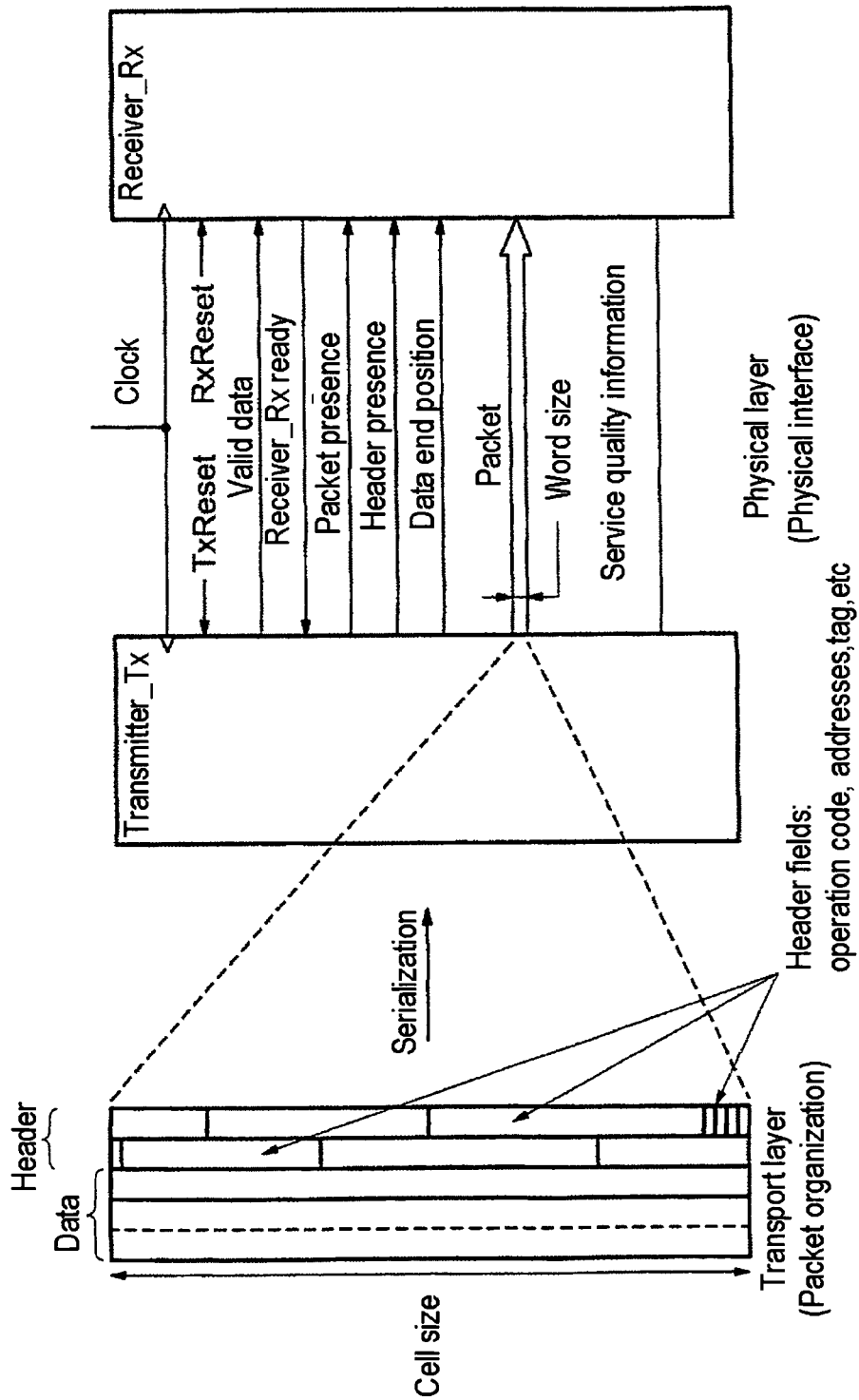
FIG. 1 illustrates the configurable protocol organized in a plurality of independent layers, according to one aspect of the invention.

As diagrammatically illustrated in FIG. 1, the protocol is defined on a number of independent layers, in this case on three layers: the physical layer, the transport layer and the transactional layer.

The transport layer is used to control the interchange of data packets. A data packet is made up of an integer number of cells of equal size.

A cell is an elementary quantity of data, the size of which is a parameter of the communication protocol.

The size of the packet header is one or two cells, depending on whether it is a response packet or a request packet. For example, the header of a request data packet contains the address of the recipient element in the network and the storage address in the addressing space of the recipient element, which does not need to be present in the header of the associated response data packet. The addressing space of the recipient element corresponds to a range of addresses that can be accessed, or at which a hardware device can be reached. These addresses can be physical or virtual.

A data packet header always contains the address of the initiating element in the system or network of interconnections, and an information tag, used to identify the various data interchanges performed by one and the same initiating element.

In practice, when an initiating element can communicate with several recipient elements, it needs to be able to identify the origin of the response data packets that it receives and it cannot therefore control the sequencing of the packets if they come from different recipient elements via different paths.

Placing the address of the recipient element in the header of a response packet can be costly if there is a large number of recipient elements.

However, since, at a given instant, the number of recipient elements corresponding with the initiating element is limited, each of these recipient elements is assigned an identifier, or a tag, on a small number of bits.

This tag is associated with the request data packet, and when the recipient element sends a corresponding response data packet, it attaches the corresponding tag to it.

The transport layer is separated from the physical layer by placing in the header of a packet all the address and control information that concerns the packet, but not information concerning the manner in which it will physically be transported.

The header of a packet contains an operation code specifying the type of operation carried out or to be carried out (for example, read type or write type), the address of the initiating element in the network and a tag identifying the corresponding recipient element.

The header of a data packet can also contain, depending on the case, the address of the recipient element, the address corresponding to the operation carried out in the addressing domain of the recipient element, the length of the data, the transport control bits (corresponding, for example, to an exclusive or secured transaction), and any other information encoded on available bits reserved for the use of the initiating elements.

The communication protocol defines, for a data packet, the positioning of the various fields in the header of the data packet according to the operation codes.

The separation of the request data packets and the response packets, with autonomous response packets, is performed by placing in the response data packet all the information needed to avoid saving contexts, in particular on changes of format on the data packets, in the elements that make up the network of interconnections.

One way of ensuring the autonomy or independence of the response data packets with respect to the request data packets is to have an operation code defining the transaction type (for example, read type or write type) and the associated quantity of data in the case of a read.

Furthermore, on a read, it may be that information that is incomplete or unaligned in relation to the memory space accessed at the time of the read in the recipient element is accessed.

In practice, the data is normally read in the format of the recipient element, and transmitted as such to the corresponding initiating element. Now, if the request requires a particular positioning of the data for the corresponding response, this positioning information must be determined from an associated response data packet.

It is, for example, possible to position the data that is read in a response data packet, at a predetermined position, and it is the initiating element that realigns the data on arrival by knowing the predetermined position.

It is also possible to insert into the header of a response data packet information for aligning the data that is read relative to the memory space accessed.

Any physical interface is independent of the message type, because, for the physical transport, all the cells or elementary data quantities are equivalent. The physical interface mainly defines the nature of the signals in the links between the elements that make up the network of interconnections.

The physical interface comprises the signals essential to the physical transport of the data during a clock cycle (FIG. 1), such as:

a clock timing signal;

independent stop and restart signals for an element of the system of interconnections including at least one reset signal. These signals can include a power supply control signal and/or a signal for initializing flow control on the link;

flow control signals relating to the clock cycles, for deleting the data packet storage queues at the nodes of the network, or for having holes in the data packets. These signals can also include a signal from the sender to the receiver of a data packet, representing data validity information, and a signal from the receiver to the sender of a data packet, comprising information representing the ability of the receiver to receive the data. A receiver that is not ready to receive data can block the sending of data by the sender;

signals delimiting data packets;

signals of configurable size for transferring data during a clock cycle, not necessarily corresponding to the size of a cell or elementary data quantity. The number of cells conveyed in each cycle, or word, defines the degree of these implementations of the data packet. The degrees of these implementations that are most practical are a quarter, a half, one, two or four cells conveyed in each clock cycle. The cell size depends on the parameters of the communication protocol;

any signals linked to the service quality of a link or, in other words, signals for favouring the transmission of some messages over others, for favouring the passage of data packets considered priority.

When necessary, the control information present in the header of a request data packet can be analysed by the recipient element and retransmitted, modified or not, to the initiating element in the associated response data packet.

The headers of the data packets include an available space reserved for the use of the initiating blocks.

For example, if a number of transactions of an initiating element are aggregated in a single request data packet at the network interface, instead of saving how the requests have been aggregated in a context queue, the information is encoded on the private bits of the reserved available space in the header of the request data packet.

When the corresponding response data packet is received by the initiating element, the private data bits that have been transmitted to it are used to separate the response and so terminate this set of transactions initiated by the initiating element.

Normally, the cell size is fixed by the constraints on the data sizes rather than the constraints on the sizes of the data packet headers. The header therefore normally includes a few unused bits, which can thus be exploited to advantageously replace context memories in the interfaces of the system of interconnections.

The content of the packet does not depend on the manner in which it is transported. The request and response data packets do not need to have the same serializations, which are defined for each link in turn, by choosing the physical width of the link.

On changes of format, the widths of the links and the clock timing frequency can change, but the bit rates are adjusted to the slowest elements by the flow control.

For a change of frequency, a FIFO type queue is used, with two clocks, the size of which is sufficient never to needlessly lose cycles corresponding to the round-trip time of the flow control in the local loop, counted as a number of cycles of the slowest clock. A size of a few words is sufficient for such a queue.

When the frequency or the size of the link is increased, data holes appear within the data packets, which can reduce the efficiency of certain recipient elements, such as a DRAM memory controller.

These data holes can be eliminated using a FIFO type queue, which stores all of a data packet before transmitting it.

However, this is costly in terms of implementation area, and in terms of latency, because, in this case, the queue needs to have a size equal to the maximum size of a data packet supported by the communication protocol.

However, when the ratio of data holes in the data packet can be predicted, the size of the compaction queue can be reduced using the size information present in the header of the data packets.

The use of this information and the knowledge of the ratio of data holes makes it possible to anticipate the sending of the data packet with no data hole, when this is possible, and without waiting for the end of the data packet.

For example, if the bit rate is doubled, the size of the queue and the latency can be reduced by a factor of two.

In a system of interconnections made up of point-to-point links, the paths between the initiating elements and the recipient elements are partially shared in order to make best use of the wires.

There are therefore data flow convergence and redistribution points at the nodes of the network of interconnections, which are implemented by means of switches.

When these nodes form routing cycles, there is a risk of deadlock in the network of interconnections by the appearance of a string of data packets that are mutually blocked. In such a deadlock situation, it is then necessary to reset all of the system.

It is possible to guarantee, by construction, the elimination of this risk of deadlock, because, with the separation of the requests and the responses, to avoid such loops, it is enough to avoid the presence of such loops in the topology of each of the request and response networks.

Figure 2:
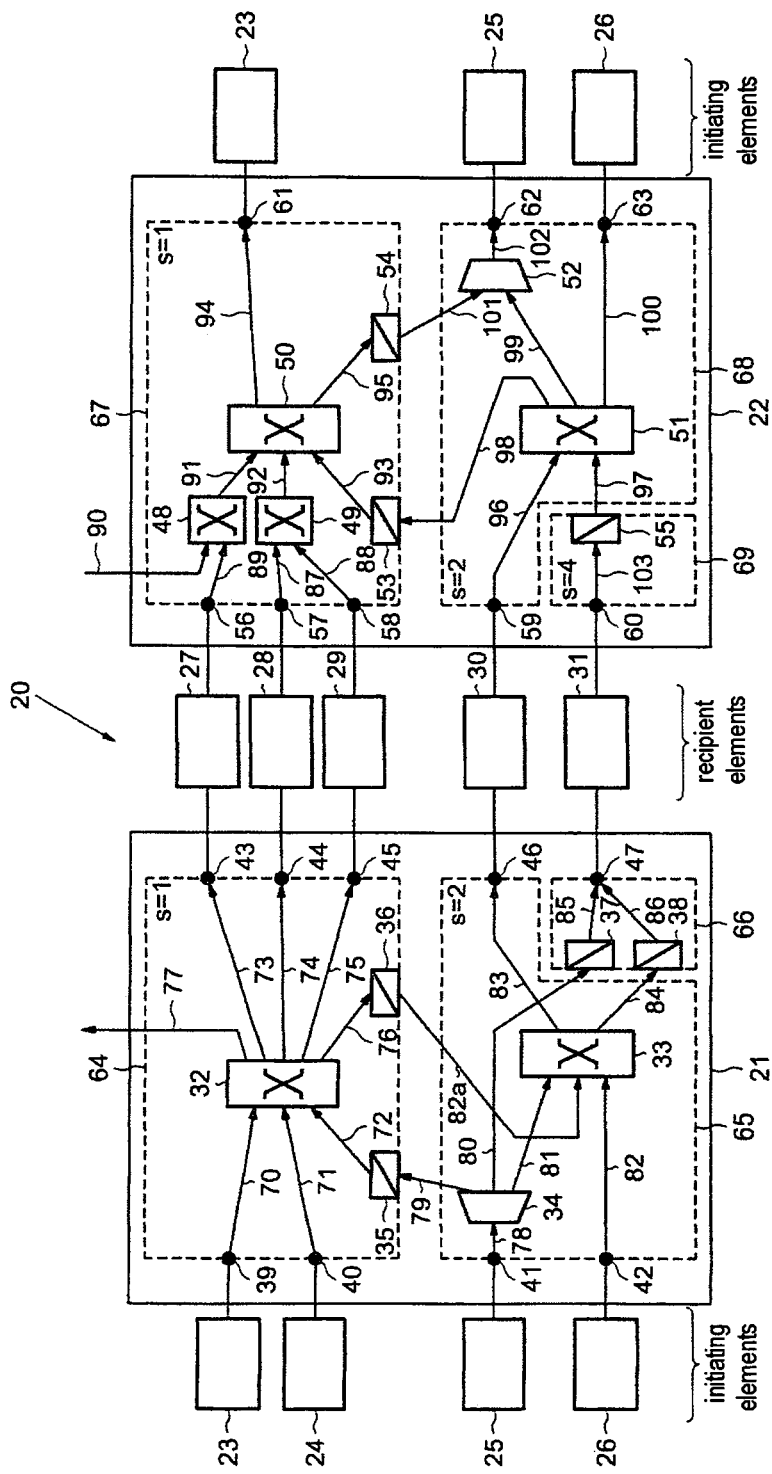
FIG. 2 illustrates a system of interconnections for external functional blocks on a chip, according to one aspect of the invention.

As illustrated in FIG. 2, the system of interconnections 20 comprises a request network 21 and a response network 22 that are physically separate.

These two physically separate networks do not include common elements, and are represented separately for greater clarity, even if, in reality, these two networks intersect.

Message initiating elements 23, 24, 25 and 26 can transmit request messages to recipient elements 27, 28, 29, 30 and 31 via the request network 21.

The recipient elements 27, 28, 29, 30 and 31 can transmit response messages to the initiating elements 23, 25, 26, which require a response on their-part, via the response networks 22.

For greater clarity, the two networks 21 and 22 have been represented side by side, and the message initiating elements 23, 24 and 26 requiring a response to a request message sent to a recipient element 27, 28, 29, 30 and 31 have been shown duplicated for greater clarity.

The request network 21 has two switches 32, 33 and a demultiplexer 34 and four format converters 35, 36, 37 and 38.

The request network 21 also comprises network interfaces 39, 40, 41 and 42, respectively dedicated to the initiating elements 23, 24, 25 and 26.

Furthermore, the request network 21 comprises network interfaces 43, 44, 45, 46 and 47, respectively dedicated to the recipient elements 27, 28, 29, 30 and 31.

The response network 22 comprises four switches 48, 49, 50 and 51, one multiplexer 52, and three format converters 53, 54 and 55. Furthermore, the response network 22 comprises network interfaces 56, 57, 58, 59 and 60, respectively dedicated to the recipient elements 27, 28, 29, 30 and 31, and network interfaces 61, 62 and 63, respectively dedicated to the initiating elements 23, 25 and 26, which require a response message after a request message has been sent.

The request network 21 comprises three subnetworks 64, 65 and 66, each having their own clock domain.

The response network 22 comprises three subnetworks 67, 68 and 69, each having their own clock domain.

The subnetwork 64 comprises the network interfaces 39, 40, 43, 44 and 45, the switch 32 and the format converters 35 and 36.

The network interfaces 39 and 40, and the format converter 35, can respectively transmit data packets, to the switch 32, via the links 70, 71 and 72.

The switch 32 can transmit data packets to the network interfaces 43, 44 and 45, and to the format converter 36, respectively via links 73, 74, 75 and 76. Furthermore, the switch 32 can transmit data packets to another element via a link 77.

The subnetwork 65 comprises the network interfaces 41, 42 and 46, the demultiplexer 34, and the switch 33. The network interface 41 can transmit data packets to the demultiplexer 34 via a link 78.

The demultiplexer 34 can transmit data packets to the format converters 35 and 37, and to the switch 33, respectively via links 79, 80 and 81. The network interface 42 can transmit data packets to the switch 33 via a link 82, and the format converter 36 via a link 82a.

The switch 33 can transmit data packets to the network interface 46 and to the format converter 38, respectively via links 83 and 84.

The subnetwork 66 comprises the format converters 37 and 38, and the network interface 47. The format converters 37 and 38 can respectively transmit data packets to the network interface 47 via links 85 and 86.

The subnetwork 67 comprises the network interfaces 56, 57 and 58, the switches 48, 49 and 50, the format converters 53 and 54 and the network interface 61.

The network interfaces 57 and 58 can transmit data packets to the switch 49, respectively via links 87 and 88. The network interface 56 can transmit data packets to the switch 48 via a link 89.

The switch 48 can also receive data packets from an element external to the response network 22 via a link 90.

The switches 48 and 49, and the format converter 53 can respectively transmit data packets to the switch 50 via links 91, 92 and 93. The switch 50 can respectively transmit data packets to the network interface 61 and to the format converter 54 via links 94 and 95.

The subnetwork 68 comprises the network interfaces 59, 62 and 63, the switch 51 and the multiplexer 52.

The network interface 59 and the format converter 55 can respectively transmit data packets to the switch 51 via links 96 and 97.

The switch 51 can respectively transmit data packets to the format converter 53, to the multiplexer 52 and to the network interface 63 via links 98, 99 and 100.

The format converter 54 can transmit data packets to the multiplexer 52 via a link 101.

Furthermore, the multiplexer 52 can transmit data packets to the network interface 62 via a link 102.

The subnetwork 69 comprises the network interface 60 and the format converter 55, and a link 103 enabling the network interface 60 to transmit data packets to the format converter 55.

Serialization s denotes the ratio of the width of the link (or word size) used to the size of the cell. For the subnetworks 64 and 67, the serialization s is one, for the subnetworks 65 and 66, the serialization s is two, and for the subnetworks 66 and 69, the serialization s is four.

In FIG. 2, the paths used for a transaction can be followed from left to right.

The initiating element (on the left) sends a request data packet which passes through the request network along a determined path to the recipient element.

The latter normally returns a response data packet through the response network for the same initiating element (duplicated on the right of the figure).

However, some initiating elements, such as memories with direct access, or DMA, do not require a response from a recipient element, and are not duplicated on the right of FIG. 2, such as the initiating element 24.

The request and response networks are not symmetrical. Also, it is advantageous to be able to make independent optimizations of the request and response networks.

Some elements that make up the network or system of interconnections can advantageously be configured by means of application software, by being able to program the values of software registers accessed by means of a network dedicated to this purpose.

Such programming is mainly done on system initialization and supports very slow bit rates. Also, it is interesting to use, to this end, a very low cost network. Each software register has its address in this dedicated network, which can be accessed by the request and response networks, with the presence, if necessary, of an interface between this dedicated network and the request and response networks.

Also, the separation of the routing in the network allows a certain independence in the optimization of each link, which facilitates the design and implementation of a set of IP blocks, or intellectual property blocks, for the elements that make up the network of interconnections.

These IP blocks are configurable and can be assembled by simply joining up standard physical interfaces end to end to form a transport network. So, this "library" will contain at least the following elements:

a utility for programming the communication protocol;

a generator of IP blocks that can be configured for each type of network interface supported;

a generator of IP blocks for configurable switches, including as parameters the number of inputs, the number of outputs, the types of routing tables, the layers of a pipeline architecture and the arbitration types;

transport IP blocks for changing the frequency and the format of the links, for compacting the packets or for transporting the packets over long distances with or without pipeline; and means required to access the configuration registers via the low cost programming network, also called service network, to configure the IP blocks generated.

Each generator can, for example, produce descriptions in Verilog or VHDL language that can be synthesized by the standard CAD tools.

These generators are coded in a language that enables the parameter space to be described easily in a structured manner.

For example, a generator can support lists of parameters, which can themselves be configured as in the case of the generator of switch IP blocks, for which it is possible to choose an arbitration type for each output, each type of arbiter having its own parameters.

What is claimed is:

1. A system comprising:
a request network in a physical layer of the system comprising a first interface for transmitting request messages from an initiating element to a recipient element; and
a response network in the physical layer of the system, physically separate from the request network, comprising a second interface for transmitting response messages from a recipient element to an initiating element, wherein the response messages include information representative of the operation carried out, and information representative of the size of data associated with said operation carried out, the information making said request and response networks able to respectively manage the request messages and the response messages independently,
where the system is included on a single semiconductor chip.

2. The system according to claim 1, wherein the operation is a data read or data write.

3. The system according to claim 1, wherein, at least one recipient block comprises a memory, and following a read of data that is incomplete or unaligned in relation to a memory space accessed in said read, data packets of the response message associated with said read include, at a predetermined position, said data that has been read.

4. The system according to claim 1, wherein, following a read of data that is incomplete or unaligned in relation to a memory space accessed in said read, the headers of the data packets of the response message associated with said read include information for aligning said data that has been read in relation to said memory space accessed.

5. The system according to claim 1, wherein one of a first interface or a second interface between two elements of the system comprises:
means for receiving or transferring a clock timing signal,
means for transferring or receiving signals for stopping or starting said elements-independently,
means for transferring flow control signals relating to clock cycles,
means for transferring data packet delimiting signals; and
means for transferring signals of configurable size for transmitting the content of data packets of said messages.

6. The system according to claim 5, in which the interface between two elements of the system also comprises signal generation means for favoring the transmission of some messages over others.

7. The system according to claim 1, wherein data packets of the messages are of variable length, equal to a multiple of an elementary quantity of data, the system including a system link being programmable by the ratio between the quantity of data that it can transmit in each clock cycle and said elementary quantity of data.

8. The system according to claim 7, wherein the system links are configured to change the clock frequency of the system or delete data holes in the data packets or change the serialization of the packets.

9. The system according to claim 1, wherein elements of the system are configurable by software through a network that is separate from the request and response networks.

10. The system according to claim 9, in which said separate network is able to operate at a lower bit rate than the average bit rate in the system.

11. A method of transmitting request and response messages in a system of interconnections having a transport layer and physical layer, the method comprising:
configuring a request network in the physical layer for transmitting a request message from an initiating element to a recipient element using the transport layer; and
configuring a response network, physically separate from the request network, in the physical layer for transmitting a response message from a recipient element to an initiating element using the transport layer, wherein the response messages include information representative of the operation carried out, and information representative of the size of the data associated with said operation carried out, and
wherein the request network and the response network are autonomous and are included on a single semiconductor chip.

12. The method of claim 11, where the configuring is by software through a network that is separate from the request and response networks.

13. The method of claim 12, in which the separate network is able to operate at a lower bit rate than the average bit rate in the system.

14. The method of claim 11, where the request message includes a header containing an address from the initiating element and a tag used to identify a sequential data interchange between the initiator element and the recipient element.

15. The method of claim 14, where the header includes an operation code defining a transaction type.

16. The method of claim 15, where the transaction type is a read transaction and the header further includes a quantity of data associated with the read transaction.

17. The method of claim 11, where a header of a data packet of a response message includes information for aligning data that is read relative to a memory space accessed.

18. The method of claim 11, further comprising:
analyzing, at the recipient element, control information in a header of a request message, modifying the control information and retransmitting the modified control information to the initiating element.

19. A non-transient, computer-readable storage medium storing instructions, which, when executed by one or more hardware processors, causes the one or more hardware processors to perform operations comprising:
configuring a request network in a physical layer of a communications protocol for a system of interconnections on a single semiconductor chip, the request network for transmitting a request message from an initiating element to a recipient element using a transport layer of the communications protocol; and
configuring a response network, physically separate from the request network, in the physical layer for transmitting a response message from a recipient element to an initiating element using the transport layer, wherein the response messages include information representative of the operation carried out, and information representative of the size of the data associated with said operation carried out, and
wherein the request network and the response network are autonomous.

* * * * *